(12) United States Patent
Plotner et al.

(10) Patent No.: US 11,267,210 B2
(45) Date of Patent: Mar. 8, 2022

(54) PRODUCTION OF A FIBER COUPLER

(71) Applicant: Fraunhofer-Gesellschaft zur Forderung der angewandten Forschung e.V., Munich (DE)

(72) Inventors: Marco Plotner, Jena (DE); Oliver De Vries, Jena (DE); Thomas Schreiber, Jena (DE)

(73) Assignee: Fraunhofer-Gesellschaft der angewandten Forschung e.V., Munche (DE)

( * ) Notice: Subject to any disclaimer, the term of this patent is extended or adjusted under 35 U.S.C. 154(b) by 359 days.

(21) Appl. No.: 15/755,876

(22) PCT Filed: Aug. 31, 2016

(86) PCT No.: PCT/EP2016/070518
§ 371 (c)(1),
(2) Date: Feb. 27, 2018

(87) PCT Pub. No.: WO2017/037115
PCT Pub. Date: Mar. 9, 2017

(65) Prior Publication Data
US 2018/0244004 A1     Aug. 30, 2018

(30) Foreign Application Priority Data

Aug. 31, 2015 (DE) .......................... 102015114505.7
Oct. 22, 2015 (DE) .......................... 102015118010.3

(51) Int. Cl.
*B29D 11/00*     (2006.01)
*G02B 6/38*     (2006.01)
(Continued)

(52) U.S. Cl.
CPC ...... *B29D 11/00663* (2013.01); *G02B 6/3837* (2013.01); *G02B 6/04* (2013.01); *G02B 6/3624* (2013.01); *G02B 6/3885* (2013.01)

(58) Field of Classification Search
CPC ....................................................... G02B 6/04
See application file for complete search history.

(56) References Cited

FOREIGN PATENT DOCUMENTS

| DE | 3405803 A1 | 8/1985 |
|---|---|---|
| EP | 1300710 A2 | 4/2003 |

(Continued)

OTHER PUBLICATIONS

International Search Report of the International Searching Authority with English translation issued in the corresponding PCT International Application No. PCT/EP2016/070518, dated Jan. 4, 2017 (5 pages).

(Continued)

*Primary Examiner* — Omar R Rojas
(74) *Attorney, Agent, or Firm* — Adams and Reese LLP; Ray R. Ferrera

(57) ABSTRACT

The invention relates to a method for producing an optical fiber coupler, having the following method steps:
  combining two or more light-guiding fibers (1, 2, 3) to form a fiber bundle;
  introducing the fiber bundle into a capillary (4);
  collapsing the capillary (4) onto the fiber bundle surrounded by the capillary. It is the object of the invention to provide an improved method for producing an optical fiber coupler. The method is intended to enable the positioning of the fibers within the capillary to be as precise as possible. At the same time, it should be possible to implement the method with comparatively little effort. To this end, the invention proposes that at least one of the fibers (1, 2, 3) is connected at the end
(Continued)

to a guide body (5, 5') whereof the diameter in the direction transversely to the longitudinal extent of the fiber (1, 2, 3) is larger than the diameter of the fiber (1, 2, 3) and smaller than the internal diameter of the capillary (4).

19 Claims, 3 Drawing Sheets

(51) Int. Cl.
*G02B 6/04* (2006.01)
*G02B 6/36* (2006.01)

(56) References Cited

FOREIGN PATENT DOCUMENTS

| EP | 2690395 A1 | | 1/2014 | |
|---|---|---|---|---|
| JP | 60024505 A | * | 2/1985 | ........... G02B 6/2808 |
| JP | 60233604 A | * | 11/1985 | |

OTHER PUBLICATIONS

Written Opinion of the International Search Authority (Form PCT/ISA/237) with English translation issued in the corresponding PCT International Application No. PCT/EP2016/070518, dated Jan. 4, 2017 (13 pages).

International Preliminary Report on Patentability Chapter I issued in the corresponding PCT International Application PCT/EP2016/070518, dated Mar. 6, 2018 (8 pages).

* cited by examiner

PRODUCTION OF A FIBER COUPLER

BACKGROUND OF THE INVENTION

Fiber couplers are known from the prior art. They serve for mechanically combining a bundle of optical fibers, i.e. optical waveguides, for example glass fibers or synthetic fibers, and producing an optical connection, for example in such a way that a fiber bundle of two or more fibers (input fibers) is coupled to a further optical fiber (output fiber) so that the light coming from the input fibers is coupled into the output fiber of the fiber bundle and further propagated there.

Such fiber couplers are typically produced in such a way that two or more fibers are combined to form a fiber bundle. The fiber bundle is then introduced into a capillary, i.e. a jacket, for example made from glass. The capillary and the fibers of the fiber bundle which are surrounded by the capillary are finally heated, whereby the capillary is collapsed onto the fiber bundle. At the same time, the fibers in the capillary are fused to the capillary under tension, wherein the diameter of the capillary including the fiber bundle is tapered toward the end of the capillary or fiber bundle. The end of the fiber coupler which is generated in this way can then be connected to a further fiber (e.g. by means of a conventional splice connection) in order to produce the optical connection between the fibers of the fiber bundle and the further fiber. Such a method is disclosed for example in WO 2007/045082 A1.

To achieve a good and uniform distribution of the luminous power among the individual fibers in the fiber coupler, it is necessary for the individual-fibers in the fiber bundle to be positioned as precisely as possible within the capillary. The fibers in the fiber bundle should be arranged as symmetrically as possible within the capillary and such that they are distributed uniformly over the cross-section of the fiber bundle. This is difficult to achieve with the production method which is conventionally used for fiber couplers.

FIG. 1 illustrates which arrangements of fibers 1, 2, 3 within the capillary 4 illustrated in longitudinal section occur when the fiber bundle is introduced into the capillary 4 in the guide direction a according to the prior art, without additional measures. In FIG. 1A, the fibers 1, 2, 3 become twisted. The microbending of the fibers 1, 2, 3 results in an increase in the numerical aperture. Moreover, the arrangement of the fibers 1, 2, 3 within the capillary 4 becomes altered, which is disadvantageous for certain applications. FIG. 1B shows a crossing-over of the fibers 2, 3. The disadvantages are identical to those in the case of FIG. 1A. Since crossings-over of directly adjacent fibers can occur over a short section within the capillary 4, the increase in the numerical aperture can be more pronounced than for the twisting illustrated in FIG. 1A. In FIG. 1C, an eccentric displacement of the fibers 1, 2, 3 within the capillary 4 occurs. Although there is no alteration to the arrangement of the fibers 1, 2, 3 as defined in the original fiber bundle, the skewed arrangement of the fibers in the capillary 4 has considerable disadvantages. If the aim is to manufacture a coupler with signal feedthrough, for example, the central fiber 2 also has to be located precisely in the center of the arrangement in order to subsequently enable a low-loss splice connection. An essential requirement of several applications is to maintain the reproducibility of the propagated light. This is lacking in the case illustrated schematically in FIG. 1C.

The said WO 2007/045082 A1 proposes using a specially structured capillary for positioning the fibers within the capillary. The capillary can have a plurality of axial channels, for example, wherein each of the channels is provided for one fiber in each case. The arrangement of the channels within the capillary therefore determines the arrangement of the fibers. On the one hand, this is disadvantageous in that the specially structured capillary requires considerable production effort. This means high costs. A further disadvantage is that the packing density of the fibers within the capillary is limited because the webs between the channels separate the fibers from one another.

Against this background, the object of the invention is to provide an improved method for producing an optical fiber coupler. The method is intended to enable the positioning of the fibers within the capillary to be as precise as possible. At the same time, it should be possible to implement the method with comparatively little effort.

The invention achieves this object starting with a method of the type mentioned at the outset in that at least one of the fibers is connected at the end to a guide body whereof the diameter in the direction transversely to the longitudinal extent of the fiber is larger than the diameter of the fiber and smaller than the internal diameter of the capillary, wherein the guide body with the fiber bundle is introduced into the capillary and guides the fiber in the capillary.

SUMMARY OF THE INVENTION

The guide body connected to at least one of the fibers centers the fibers during the forward movement within the capillary. It is thus prevented that the systematic and virtually parallel arrangement of the fibers in the direction of the longitudinal extent of the fibers is altered during the introduction of the fiber bundle into the capillary. It is prevented that the static attraction and friction between the individual fibers or between the fibers and the inside wall of the capillary result in the specified arrangement of the fibers being disturbed. The twistings, crossings-over and eccentricity of the fibers which occur in the prior art do not arise.

The diameter of the guide body is ideally only slightly smaller than the internal diameter of the capillary. This means that the difference between the internal diameter of the capillary and the diameter of the guide body should be less than the diameter of a fiber of the fiber bundle. Reliable guidance of the fiber bundle is thus ensured since fibers cannot arrive in the clearance between the guide body and the inside wall of the capillary. At the same time, the guide body is easily movable in the capillary so that blocking does not occur during the introduction.

As a result of centering the at least one fiber connected to the guide body within the capillary, at least this fiber is secured in the radial direction within the capillary. Friction and static attraction between the fibers of the fiber bundle then collectively ensure the stabilization of the fiber bundle during the introduction into the capillary.

A capillary in the sense of the invention is any jacket, for example consisting of quartz glass, of the fiber bundle, into which the fiber bundle is introduced during the production of the fiber coupler. The capillary can have any symmetrical or asymmetrical cross-section. It can be a hollow cylinder, a hexagonal prism or a hollow body having a D-shaped area or the like.

In a preferred embodiment of the method according to the invention, the diameter of the guide body is at least twice as large as the diameter of the fiber. This enables the fiber connected to the guide body to be centered within the capillary, wherein sufficient clearance for further fibers of the fiber bundle remains around the centered fiber.

The guide body preferably forms that end of the fiber bundle which is to be introduced into the capillary. The centering of the fiber connected to the guide body, and therefore the fiber bundle as a whole, can therefore take place particularly effectively. Moreover, the option arises of arranging a pulling means on the guide body arranged at the end of the fiber bundle, by means of which the fiber bundle can be pulled into the capillary. Introducing the fiber bundle into the capillary by pulling is particularly advantageous for maintaining the specified arrangement of the fibers within the fiber bundle in the capillary.

In a particularly practical embodiment, the guide body is spherical. In this case, the guide body can be produced simply by fusing the fiber end of the fiber connected to the guide body. During the fusing of the fiber end, a sphere forms automatically owing to the surface tension of the material. In this design, the guide body is therefore formed in one piece with the fiber.

The guide body can alternatively have a disk shape and, in this case, be oriented transversely to the longitudinal axis of the fiber connected to the guide body. This can be a circular disk shape. It is likewise possible for the guide body to be hexagonally shaped.

In a possible embodiment of the method according to the invention, instead of only one of the fibers being connected to a guide body, two or more of the fibers are each connected to a guide body. Therefore, a plurality of guide bodies are used. The size and geometry of the guide bodies can be different and are selected according to the desired arrangement of the fibers within the capillary. In this case, a guide body connected to a fiber lying further outward in the fiber bundle relative to the longitudinal axis of the fiber bundle has a smaller diameter than a guide body connected to a fiber lying further inward in the fiber bundle. The guide body connected to the fiber lying further inward has to be larger so that it can center this fiber within the capillary. The guide body which is connected to the fiber lying further outward is intended to guide this fiber in the clearance between the further inwardly lying fiber of the fiber bundle and the inside wall of the capillary, which means that it has to be correspondingly smaller. The guide body connected to the fiber lying further outward in the fiber bundle is then expediently at a greater distance from that end of the fiber bundle which is to be introduced into the capillary than the guide body connected to the fiber lying further inward in the fiber bundle. The largest guide body should form the end of the fiber bundle so that it guides and centers the fiber bundle as a whole in the interior of the capillary. On the fiber lying further outward in the fiber bundle, the corresponding guide body can be arranged eccentrically so that the fiber maintains a sufficient distance from the inside wall of the capillary, for example, and at the same time lies directly against the further inwardly lying fiber of the fiber bundle.

In a further possible embodiment of the method according to the invention, two or more of the fibers are connected to the same guide body. It is even possible that all fibers of the fiber bundle are connected to only a single common guide body. In this case, the individual guide body ensures the guidance and positioning of all fibers of the fiber bundle within the capillary.

The fibers used according to the invention are conventional optical waveguides (for example glass fibers) as are known from the prior art. They each have a core and a sheath which differ in terms of the refraction index. The guide bodies used according to the invention can also consist of the same material as the fibers.

If the sheath of the fibers has a protective jacket on its outer surface, this should be removed in advance in the region to be introduced into the capillary.

The method according to the invention can be used in cascaded form. This means that two or more fiber bundles produced according to the invention are each in turn combined with capillaries collapsed thereon to form a bundle (referred to here as a "multi-fiber bundle"). This multi-fiber bundle is introduced into a further capillary and the further capillary is collapsed onto the multi-fiber bundle surrounded by the further capillary by heating. As described above, at least one of the fiber bundles can also in turn be connected at the end to a guide body whereof the diameter in the direction transversely to the longitudinal extent of the fiber bundle is larger than the diameter of the fiber bundle and smaller than the internal diameter of the further capillary.

The option thus arises of producing a fiber coupler which couples a large number of fibers.

BRIEF DESCRIPTION OF THE DRAWINGS

Exemplary embodiments of the invention are explained in more detail below with reference to the drawings, which show.

DETAILED DESCRIPTION OF THE INVENTION

Figure 1:
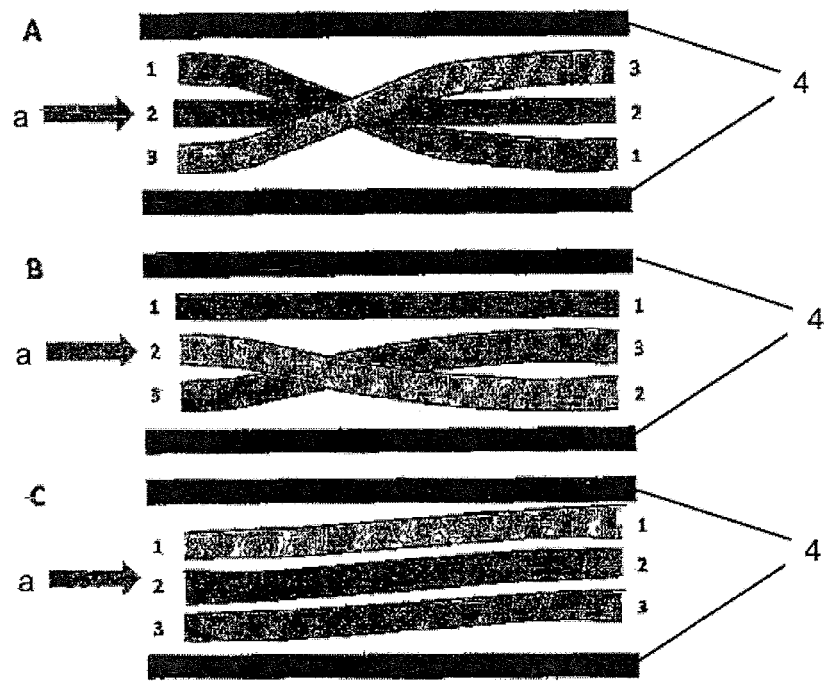
FIG. 1: possible faulty configurations of fibers within capillaries according to the prior art.
Figure 2:
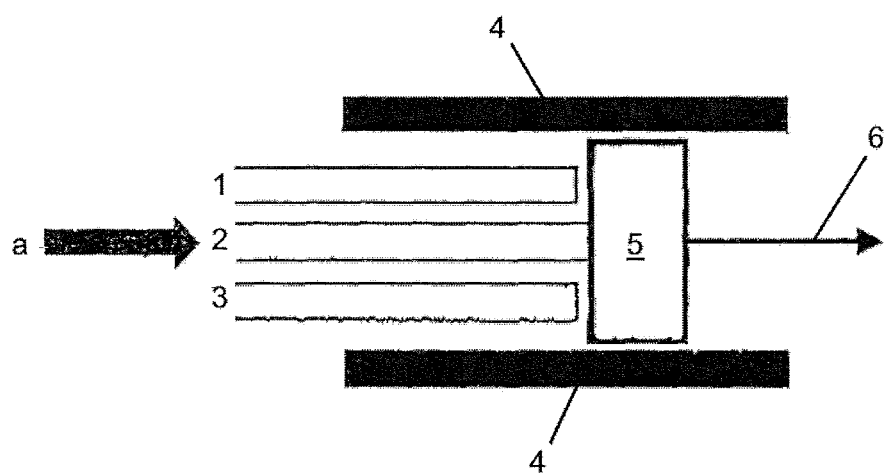
FIG. 2: the introduction of a fiber bundle comprising a plurality of fibers into a capillary using a guide body according to the invention.

FIG. 2 illustrates the principle of the invention schematically. The three light-guiding fibers 1, 2, 3 are firstly combined to form a fiber bundle. The fiber bundle is introduced into a capillary 4 in direction a. To produce the fiber coupler, the capillary 4 is finally collapsed onto the fiber bundle surrounded by the capillary and comprising the fibers 1, 2, 3 by heating the capillary. The central fiber 2 is connected at the end, i.e. at its right end in FIG. 2, to a guide body 5. As can be seen in FIG. 2, the diameter of the guide body 5 in the direction transversely to the longitudinal extent of the fiber 2 is larger than the diameter of the fiber 2 and somewhat smaller than the internal diameter of the capillary 4. The diameter of the guide body 5 here is smaller than the internal diameter of the capillary 4. In particular, the gap between the inside wall of the capillary 4 and the radially outer surface of the guide body 5 is narrower than the diameter of one of the fibers 1, 2, 3. It is thus prevented that one of the fibers 1, 2, 3 arrives in the gap between the guide body 5 and the capillary 4. A pulling means 6 is arranged on the guide body 5, by means of which the fiber bundle is pulled into the capillary 4 in the direction of the arrow. The pulling means 6 is optional. The introduction of the fiber bundle with the guide body 5 according to the invention is also possible without pulling means 6 by pushing, i.e. in a conventional manner. The geometric dimensions of the capillary 4 and the guide body 5 are determined by the diameter and the number of fibers 1, 2, 3. The method according to the invention enables fiber optic couplers to be realized with low optical losses for both single-mode and multi-mode fibers and their respective applications, e.g. as pump couplers with or without signal feedthrough. In the exemplary embodiment illustrated in FIG. 2, only the center fiber 2 is connected to the guide body 5. In this exemplary embodiment, a passive self-structuring is realized within the fiber bundle. The majority of the fibers of the fiber bundle are in fact freely movable at first. However, if the fiber bundle is moved in direction a within the capillary 4, the arrangement of the fibers 1, 2, 3 is maintained because the fibers 1, 3 which are not connected to the guide body 5 are prevented from moving in alternative directions. To achieve this, the shape and the geometric dimensions of the guide body 5, the capillary 4 and the fibers 1, 2, 3 are selected according to the desired design of the optical fiber coupler. Examples of this are illustrated in FIG. 3.

Figure 3:
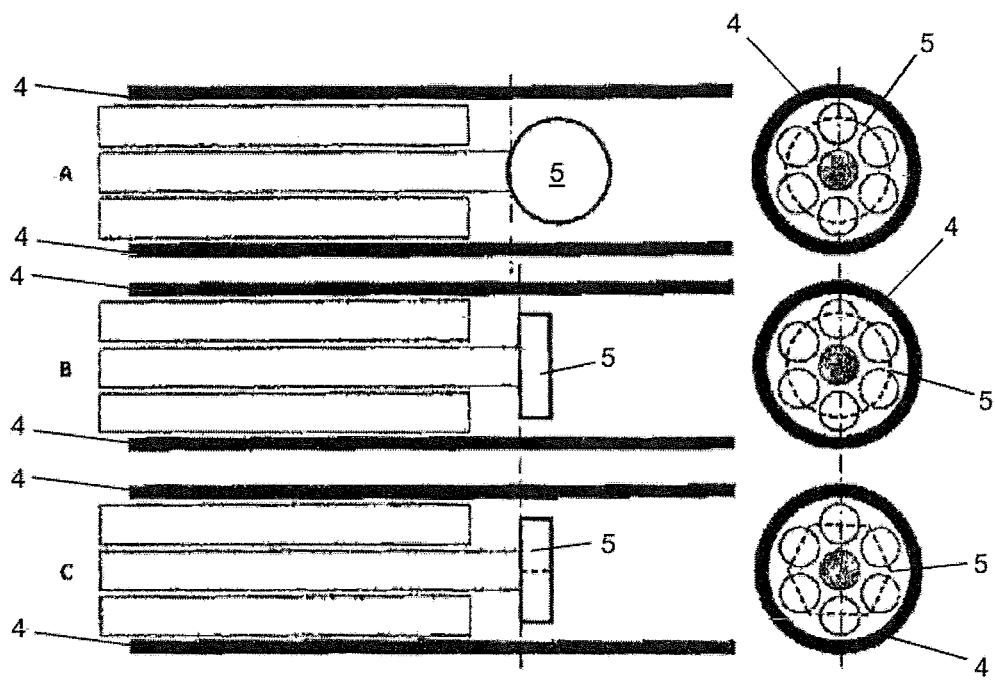
FIG. 3: the inventive use of guide bodies of different geometries with a fiber bundle comprising seven fibers.

FIG. 3 shows a longitudinal section on the left and a cross-section through the capillary 4 with the fiber bundle located therein on the right. The fiber bundle comprises 7 fibers with a centrally arranged fiber and six fibers arranged hexagonally around the central fiber. In the exemplary embodiment of FIG. 3A, the guide body 5 is spherical. This spherical shape (also referred to as a "ball lens") can be produced particularly simply with conventional splice devices, which minimizes the manufacturing effort and the costs. By heating the end of the central fiber, its material fuses and forms a ball owing to the surface tension. In the exemplary embodiment of FIG. 3B, the guide body 5 has a circular disk shape. In the exemplary embodiment of FIG. 3C, the guide body 5 has a hexagonal cross-section.

Figure 4:
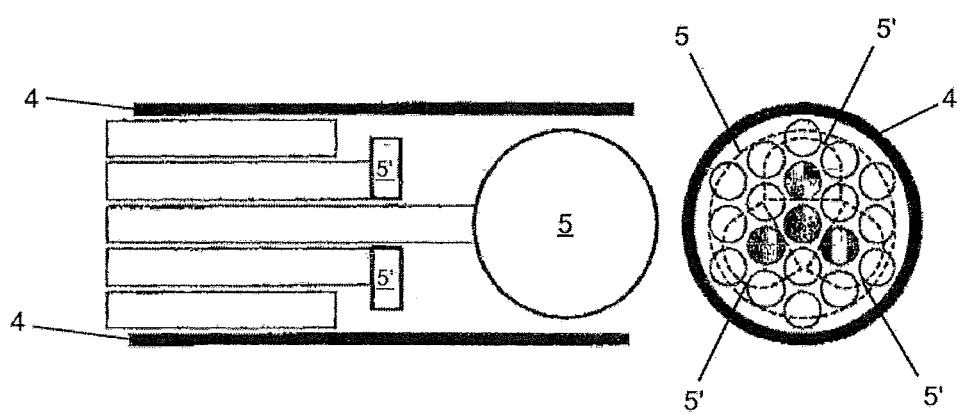
FIG. 4: the inventive use of guide bodies of different geometries and size with a fiber bundle comprising nineteen fibers.

In the exemplary embodiment of FIG. 4, the fiber bundle comprises a total of nineteen fibers. A total of 4 guide bodies 5 and 5' are provided. The guide body 5 is spherical and connected to the central fiber. The three guide bodies 5', are each connected to a fiber lying further outward in the fiber bundle. The guide bodies 5' have a D-shaped cross-section. In this case, the guide bodies 5' have a smaller diameter than the guide body 5. The guide bodies 5' are at a further distance from the end of the fiber bundle which is to be introduced into the capillary 4 than the guide body 5; it can be seen in FIG. 4 that the guide bodies 5' are arranged eccentrically on the respective fibers. Therefore, the corresponding fibers on the inside are guided along the central fiber and, on the outside, along the inside wall of the capillary 4. In the illustrated embodiment, a passive self-structuring of the entire fiber bundle is realized. The fibers of the fiber bundle which are lying the furthest outward are not connected to guide bodies in the exemplary embodiment.

Figure 5:
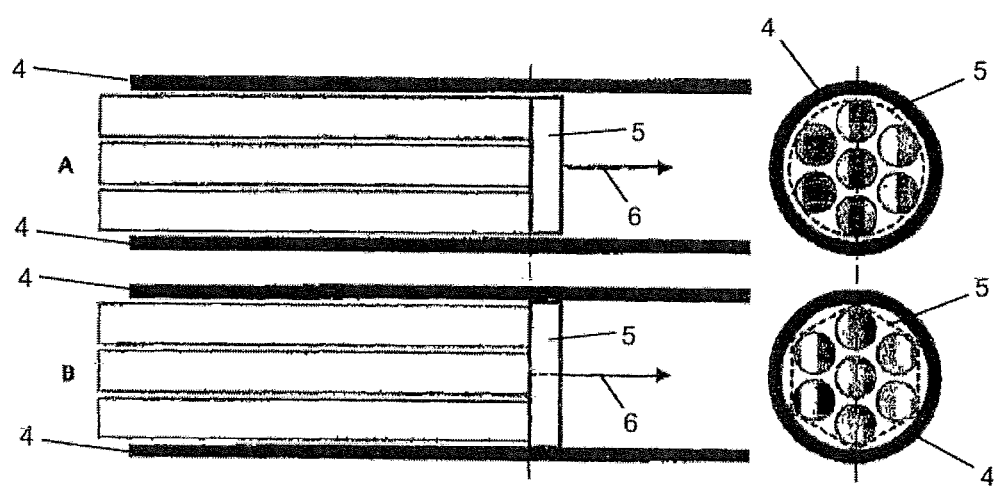
FIG. 5: the inventive use of individual guide bodies with fiber bundles each comprising seven fibers.

In the exemplary embodiment shown in FIG. 5, the fiber bundle again comprises seven fibers. All fibers are connected to the guide bodies 5. As in FIG. 2, a pulling means 6 is provided to pull the fiber bundle through the respective capillary 4. The pulling means 6 can likewise be a fiber, for example, which is securely connected to the respective guide body 5. The method illustrated in FIG. 5 for producing the optical fiber coupler requires that the individual fibers are positioned on the guide body 5, and secured there, before the introduction into the respective capillary 4. This can take place using any type of connection known in the field of fiber technology, for example by splicing, adhesion, bonding or soldering. In the example of FIG. 5A, the guide body 5 has a circular disk shape. In the example of FIG. 5B, the guide body 5 has a hexagonal cross-section.

The last step of producing the fiber coupler, namely the collapsing of the capillary 4 onto the fiber bundle surrounded by the capillary, is not illustrated in the figures. In this case, the fibers of the fiber bundle introduced into the capillary 4 are typically fused to the capillary 4 under tension, wherein the diameter of the capillary 4 including the fiber bundle tapers towards its end. The tapered end can be adapted in terms of its diameter to the fiber to be connected to the fiber bundle.

As illustrated in FIGS. 2-5, the method according to the invention has a range of advantages. The power efficiency of fiber optic couplers can be increased since losses caused by microbending of the fibers and an excessive numerical aperture are minimized. The method according to the invention enables a particular transverse arrangement and symmetry of the fibers to be specifically maintained. The transverse light modes can thus be localized, which is crucial in fiber optic couplers with signal feedthrough or in so-called photonic lanterns. By maintaining the transverse symmetry of the arrangement of fibers, it is possible to realize a coupling to multi-core fibers. A fiber coupler produced according to the invention can be used as a geometric spectral beam combining unit, wherein, by way of example, a plurality of single-mode or few-mode beams of a fiber laser can be superposed in a multi-mode or few-mode fiber. Although the output radiation in this case does not have a single-mode quality, the numerical aperture of the output emission can be considerably lower than that of the respective output fiber. If required, double refractive structures can be positioned precisely at defined points within the optical fiber coupler produced according to the invention. By maintaining the symmetry of the fiber arrangement and by preventing twistings and bendings of the fibers, unnecessary steepening of the numerical aperture is reduced. The beam quality is therefore maintained.

The invention claimed is:

1. A method for producing an optical fiber coupler, having the following method steps:
combining two or more light-guiding fibers to form a fiber bundle;
introducing the fiber bundle into a capillary;
collapsing the capillary onto the fiber bundle surrounded by the capillary, wherein a central fiber is connected at its end to a guide body whereof the diameter in the direction transversely to the longitudinal extent of the fiber is larger than the diameter of the fiber and smaller than the internal diameter of the capillary, wherein the guide body with the fiber bundle is introduced into the capillary and guides the fiber in the capillary, wherein at least one of the other fibers, which is lying further outward in the fiber bundle, is not connected to the guide body.

2. The method as claimed in claim 1, wherein two or more of the fibers are each connected to a further guide body, wherein the fibers lying outermost in the fiber bundle are not connected to any guide body.

3. The method as claimed in claim 2, wherein the further guide bodies each have a smaller diameter than the guide body connected to the central fiber.

4. The method as claimed in claim 1, wherein the diameter of the guide body connected to the central fiber is at least twice as large as the diameter of the central fiber.

5. The method as claimed in claim 1, wherein the guide body connected to the central fiber forms that end of the fiber bundle which is to be introduced into the capillary.

6. The method as claimed in claim 1, wherein, during the introduction into the capillary, the guide body connected to the central fiber centers the fiber in the capillary.

7. The method as claimed in claim 1, wherein the guide body is spherical.

8. The method as claimed in claim 1, wherein the guide bodies are produced by fusing the fiber end of the fiber connected to the respective guide body.

9. The method as claimed in claim 1, wherein at least one of the guide bodies has a disk shape and is oriented transversely to the longitudinal axis of the fiber connected to it.

10. The method as claimed in claim 9, wherein at least one of the guide bodies is hexagonally shaped.

11. The method as claimed in claim 2, wherein the further guide bodies are at a greater distance from that end of the fiber bundle which is to be introduced into the capillary than the guide body connected to the central fiber.

12. The method as claimed in claim 2, wherein the further guide bodies are arranged eccentrically on the respective fiber lying further outward in the fiber bundle.

13. The method as claimed in claim 1, wherein two or more of the fibers are connected to the same guide body.

14. The method as claimed in claim 1, wherein the fiber bundle is pulled into the capillary by a pulling means arranged on the guide body.

15. The method as claimed in claim 1, wherein the fibers of the fiber bundle introduced into the capillary are fused to the capillary under tension, wherein the diameter of the capillary including the fiber bundle tapers toward its end.

16. The method as claimed in claim 1, having the following further method steps:
   combining two or more of the fiber bundles each with a capillary collapsed thereon to form a multi-fiber bundle;
   introducing the multi-fiber bundle into a further capillary;
   collapsing the further capillary onto the multi-fiber bundle surrounded by the further capillary by heating the further capillary.

17. The method as claimed in claim 16, wherein at least one of the fiber bundles is connected at the end to a guide body, whereof the diameter in the direction transversely to the longitudinal extent of the fiber bundle is larger than the diameter of the fiber bundle and smaller than the internal diameter of the further capillary.

18. The method as claimed in claim 1, wherein the guide body consists of glass or synthetic material.

19. The method as claimed in claim 1, wherein the optical fibers are glass fibers or synthetic fibers.

* * * * *